United States Patent
Miura et al.

(10) Patent No.: US 8,964,269 B2
(45) Date of Patent: Feb. 24, 2015

(54) IMAGE READER

(71) Applicants: Katsuro Miura, Toyota (JP); Yoshinori Osakabe, Seto (JP); Muneaki Takahata, Toyoake (JP)

(72) Inventors: Katsuro Miura, Toyota (JP); Yoshinori Osakabe, Seto (JP); Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/845,961

(22) Filed: Mar. 18, 2013

(65) Prior Publication Data
US 2013/0321884 A1  Dec. 5, 2013

(30) Foreign Application Priority Data

May 31, 2012 (JP) ................. 2012-125051

(51) Int. Cl.
*H04N 1/04* (2006.01)
*H04N 1/00* (2006.01)
*H04N 1/12* (2006.01)
*H04N 1/195* (2006.01)

(52) U.S. Cl.
CPC ......... *H04N 1/0057* (2013.01); *H04N 1/00618* (2013.01); *H04N 1/12* (2013.01); *H04N 1/195* (2013.01)
USPC .......... 358/498; 385/474; 385/497; 271/3.14; 399/380

(58) Field of Classification Search
CPC .......... H04N 1/00559; H04N 1/00647; H04N 1/00015; H04N 1/00572; H04N 1/00578; H04N 1/0058; H04N 1/00631; H04N 1/193; H04N 1/00602; B65H 2801/06; B65H 31/10; B65H 33/16; B65H 39/11; G03G 15/6547; G03G 2215/0089
USPC .......... 358/474, 498, 496, 497, 486; 271/256, 271/3.14, 225, 10.09, 163, 213; 399/401, 399/263, 367, 380
See application file for complete search history.

(56) References Cited

U.S. PATENT DOCUMENTS

| | | | | |
|---|---|---|---|---|
| 4,208,122 A | * | 6/1980 | Iwamoto et al. | 399/403 |
| 5,005,052 A | * | 4/1991 | Watanabe et al. | 399/373 |
| 5,041,874 A | * | 8/1991 | Nishimori et al. | 399/203 |
| 5,055,946 A | * | 10/1991 | Kurahashi et al. | 358/498 |
| 5,580,039 A | * | 12/1996 | Takehara et al. | 270/58.11 |
| 6,678,076 B1 | | 1/2004 | Hasegawa et al. | |
| 7,202,983 B2 | | 4/2007 | Yokota et al. | |
| 7,377,511 B2 | * | 5/2008 | Watanabe et al. | 271/292 |
| 7,561,825 B2 | * | 7/2009 | Hirose et al. | 399/110 |

(Continued)

FOREIGN PATENT DOCUMENTS

| | | |
|---|---|---|
| EP | 1292104 A1 | 3/2003 |
| EP | 1718056 A1 | 11/2006 |

(Continued)

OTHER PUBLICATIONS

Extended European Search Report issued in corresponding European Patent Application No. 13161603.9 mailed Sep. 4, 2013.

*Primary Examiner* — Negussie Worku
(74) *Attorney, Agent, or Firm* — Banner & Witcoff, Ltd.

(57) ABSTRACT

An image reader includes a discharge cover disposed on a side of the image reader, the discharge cover forming part of a side surface when closed and forming a discharge port when opened. Undesired illumination from light entering the image reader through the discharge port is suppressed from impinging on a contact image sensor.

22 Claims, 8 Drawing Sheets

(56) References Cited

U.S. PATENT DOCUMENTS

| | | |
|---|---|---|
| 7,771,553 B2* | 8/2010 | Lemens et al. ............... 156/227 |
| 7,952,770 B2 | 5/2011 | Ikeno et al. |
| 8,130,423 B2 | 3/2012 | Nakano et al. |
| 8,275,304 B2* | 9/2012 | Takenaka ..................... 399/405 |
| 8,493,639 B2* | 7/2013 | Samoto et al. ............... 358/498 |
| 8,608,152 B2* | 12/2013 | Takahata ..................... 271/3.14 |
| 2002/0054387 A1 | 5/2002 | Yokota et al. |
| 2003/0038989 A1 | 2/2003 | Yokota et al. |
| 2003/0091366 A1 | 5/2003 | Saito et al. |
| 2006/0164482 A1 | 7/2006 | Katayama et al. |
| 2006/0245013 A1 | 11/2006 | Ikeno et al. |
| 2006/0250661 A1 | 11/2006 | Susaki |
| 2008/0123163 A1 | 5/2008 | Nakano et al. |
| 2011/0199654 A1 | 8/2011 | Takata |
| 2012/0155941 A1* | 6/2012 | Kozaki et al. ............... 399/367 |

FOREIGN PATENT DOCUMENTS

| | | |
|---|---|---|
| EP | 1926300 A2 | 5/2008 |
| JP | 10-013636 A | 1/1998 |
| JP | 2000128413 A | 5/2000 |
| JP | 2007049300 A | 2/2007 |
| JP | 2009-153086 A | 7/2009 |
| JP | 2011171957 A | 9/2011 |

* cited by examiner

% IMAGE READER

CROSS-REFERENCE TO RELATED APPLICATION

This application claims priority from Japanese Patent Application No. 2012-125051, filed on May 31, 2012, which is incorporated herein by reference in its entirety.

FIELD OF DISCLOSURE

The disclosure relates to an image reader which reads an image on a document.

BACKGROUND

Image readers for reading an image on a document are used by themselves as an image scanner, or used in combination with an image forming device as a multifunction apparatus.

An image reader is provided, for example, with an image sensor and a document conveying path extending past the image sensor. The conveying path is formed by a plurality of rollers for conveying the document, guide surfaces for guiding the document, and the like members. While the document is conveyed along the document conveying path, the document comes to face the image sensor. In this instance, light is cast from the image sensor onto the document. Then, the reflected light from the document is received by the image sensor, whereby reading of the image formed on the document is achieved.

Among such image readers, there are those in which a document may be conveyed through either of two document conveying path, and either of the two document conveying path is selectively established by movable of a cover provided in a main body of the device. According to one conventional configuration, a U-shaped document conveying path is formed by the inner surface of the cover when the cover is in a closed state. When the cover is in an open state, on the other hand, a certain part of the U-shaped document conveying path is opened, whereby a straight document conveying path is formed. In the case of a document with comparatively low stiffness, the cover is kept closed and the document is conveyed through the U-shaped document conveying path, whereby reading of the image on the document is achieved. In the case of a document with comparatively high stiffness such as a thick document, on the other hand, the cover is opened and the document is reasonably conveyed through the straight document conveying path, whereby reading of the image on the document is realized.

SUMMARY

The above-mentioned configuration, however, has a problem as follows. When the cover is opened, a part constituting the certain part of the U-shaped document conveying path is exposed. As a result, light coming from the exterior of the image reader (external light) is liable to enter into the vicinity of the image sensor.

If external light enters into the vicinity of the image sensor, reading of a white reference by the image sensor would fail to yield correct white color data. As a result, shading correction or the like based on the white color data may not be performed adequately, and accuracy of image reading is lowered. In addition, at the time of reading the image on a document, image reading accuracy may be lowered by external light.

Thus, there is a need for an image reader in which external light may be restrained from entering into the vicinity of a reading unit.

According to an illustrative embodiment of the disclosure provide for an image reader, there is provided an image reader including: a contact glass, a reading unit, a conveyor, and a cover that covers the contact glass and the convey roller. The document cover includes a movable member. The movable member, in a closed position, forms part of a side surface of the cover and, in an open position, forms a discharge port. The reading unit reads an image from a document as a document moves relative to the contact glass. The reading unit further includes a surface located between the conveyor and the discharge port, the surface configured to support the document when being discharged through the discharge port.

According to another illustrative embodiment of the disclosure provide for an image reader, there is provided an image reader including: a first contact glass and an openable document cover that covers the first contact glass, the openable document cover including a movable member, a document conveyer and a reading unit. The movable member, in a closed position, forms part of a side surface of the cover and, in an open position, forms a discharge port. In a first reading mode, the reading unit reads an image from a document on the first contact glass by moving relative to the first contact glass. In a second reading mode, the reading unit reads an image from a document as the first document moves relative to the first contact glass and the reading unit is stationary relative to the first contact glass.

According to a further illustrative embodiment of the disclosure provide for an image reader, there is provided an image reader including: a contact glass, a reading unit, a convey roller, and a cover that covers the contact glass and the convey roller. The document cover includes a movable member. The movable member, in a closed position, forms part of a side surface of the cover and, in an open position, forms a discharge port. The reading unit reads an image from a document as a document moves relative to the contact glass. The cover further including a wall extending parallel to an axis of rotation of the convey roller, the wall separating the convey roller from a space between the convey roller and the movable member.

According to the illustrative embodiments of the disclosure provide for an image reader, external light may be restrained from entering into the vicinity of the reading unit. As a result, image reading accuracy may be restrained from being lowered due to entering of external light.

DETAILED DESCRIPTION OF EMBODIMENTS

Hereinafter, illustrative embodiments in which a multifunction peripheral 1 embodies an image reader according to the aspects of the disclosure are described with reference to the accompanying drawings.

<Multifunction Apparatus>

Figure 1:
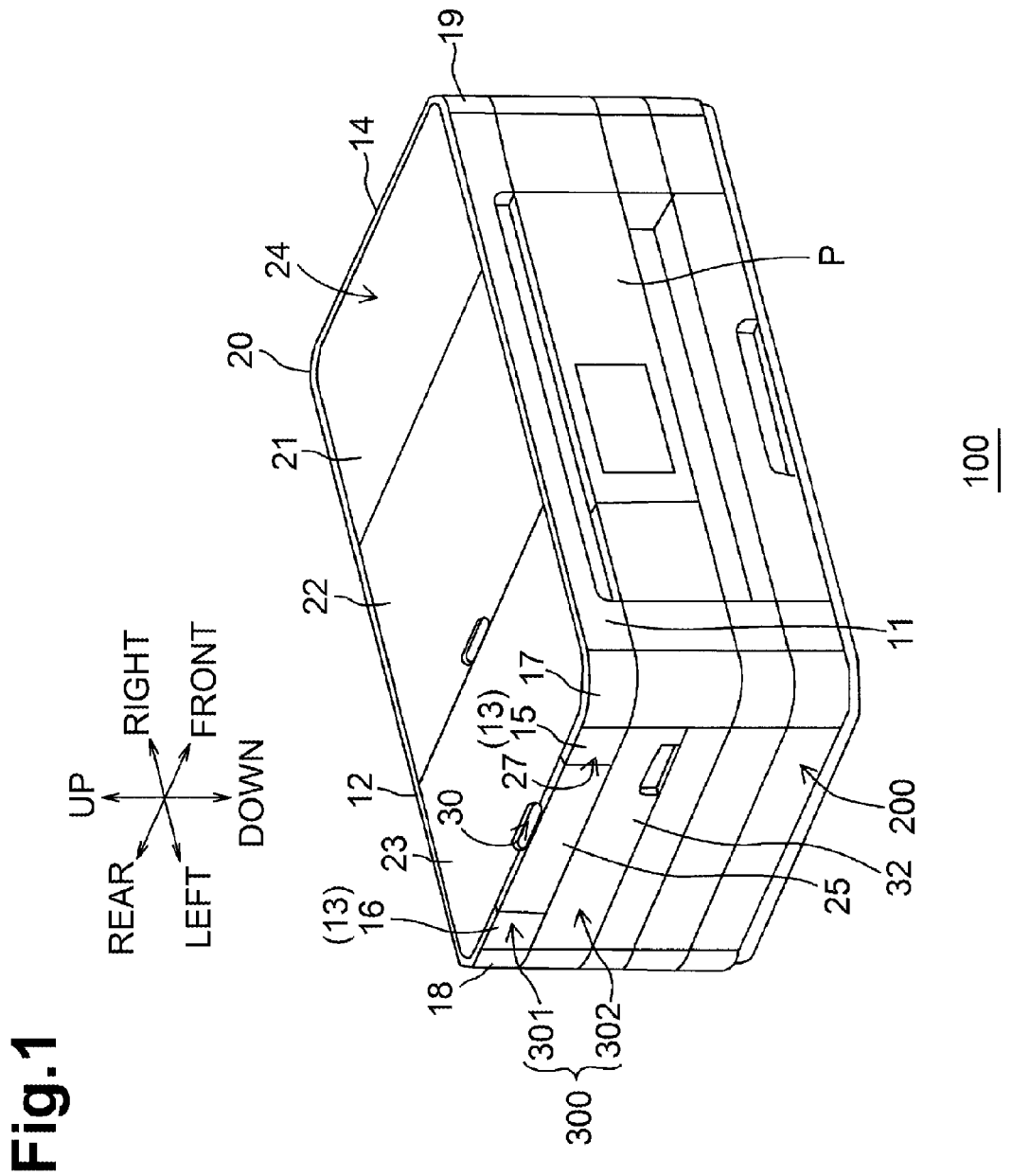
FIG. 1 is a perspective view, from the left front upper side, of a multifunction apparatus based on an illustrative embodiment of the disclosure provide for an image reader, showing the condition where a document conveyor is closed.

As shown in FIG. 1, a multifunction apparatus 100 has a roughly rectangular parallelepiped shape. The multifunction apparatus 100 includes an image forming unit 200, and an image reading unit 300 disposed on the image forming unit 200.

The image forming unit 200 has a roughly rectangular parallelepiped shape. The image forming unit 200 has incorporated therein an image forming mechanism of an ink jet system or electrophotography system for realizing a printer function.

At an upper portion on the front side of the image forming unit 200 is disposed an operating panel P for operation by the user.

Incidentally, the upper, lower, left and right sides of the components of the multifunction apparatus 100 are specified as viewed from the front side of the image forming unit 200. In FIG. 1 and the latter figures, the thus specified directions are indicated by arrows, for easier understanding of the drawings.

The image reading unit 300 as an example of the image reader has a flat, roughly rectangular parallelepiped shape. The image reading unit 300 may be rotationally displaced into a posture of being stacked on the image forming unit 200 and into a posture of being opened while lifted up on the front side in relation to the image forming unit 200, with an axis extending in the left-right direction near the rear upper end of the image forming unit 200 as a center of rotational displacement.

In the condition where the image reading unit 300 is opened relative to the image forming unit 200, the inside of the image forming unit 200 is exposed. In this condition, maintenance of the components inside the image forming unit 200, replacement of expendables, and the like operations may be carried out.

Figure 2:
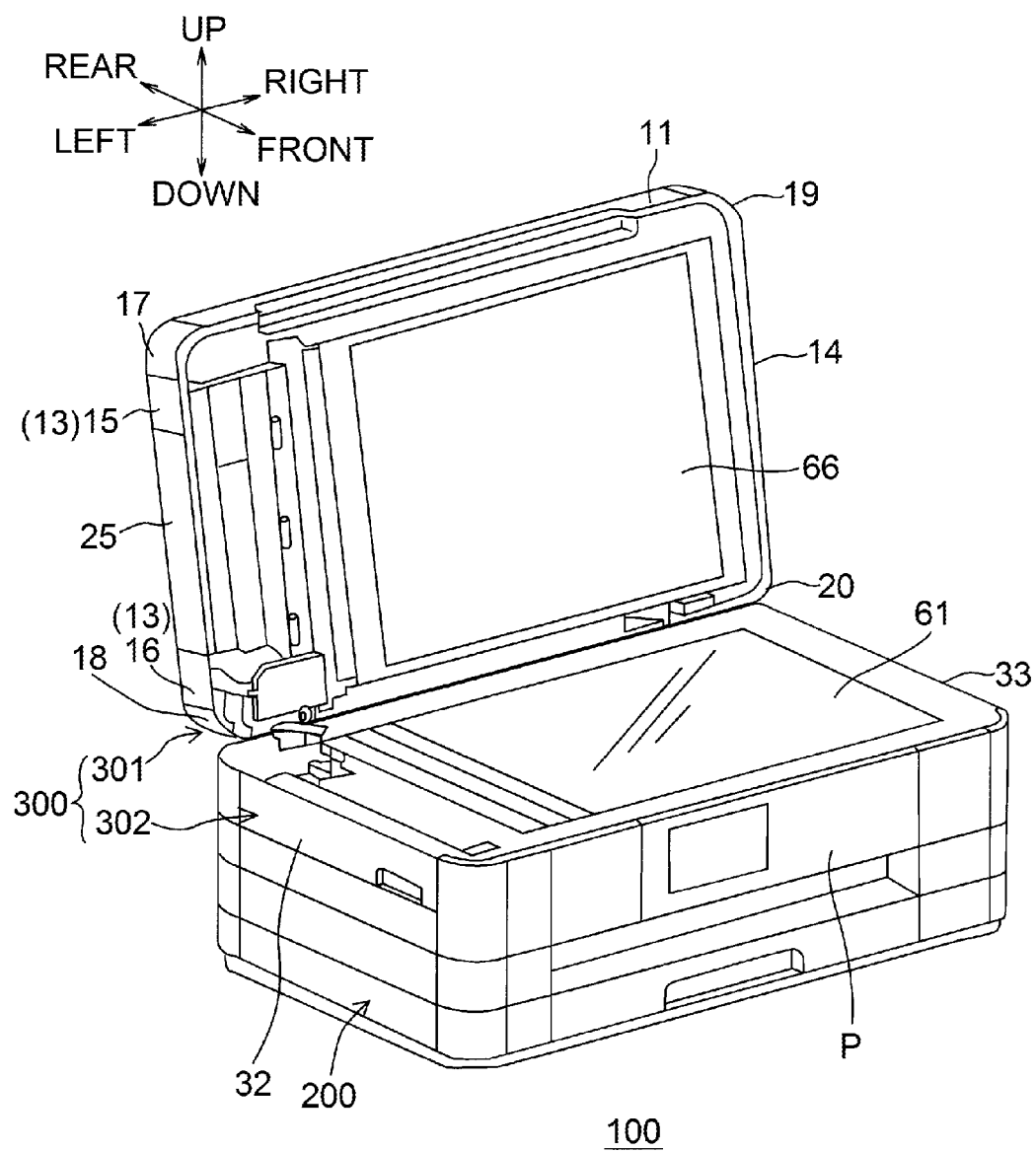
FIG. 2 is a perspective view, from the left front upper side, of the multifunction apparatus, showing the condition where the document conveyor is opened.

The image reading unit 300 includes an upper unit 301 and a lower unit 302. The upper unit 301 is an example of a document cover. The upper unit 301 may be rotationally displaced into a posture of being stacked on the lower unit 302 as shown in FIG. 1 and into a posture of being opened while lifted up on the front side relative to the lower unit 302 as shown in FIG. 2, with an axis extending in the left-right direction near the rear upper end of the lower unit 302 as a center of rotational displacement.

<External Appearance Configuration of Image Reading Unit>

The upper unit 301 of the image reading unit 300 includes a front side plate 11, a rear side plate 12, a left side plate 13 and a right side plate 14.

The front side plate 11 and the rear side plate 12 each have a rectangular side-view shape elongated in the left-right direction, and they are disposed opposite to each other, with a front-rear-directional spacing therebetween.

The left side plate 13 includes a front left side plate 15 having a tetragonal shape in side view and disposed on a relatively front side, and a rear left side plate 16 having a tetragonal shape in side view and disposed on a relatively rear side. The front end edge of the left side plate 15 is connected to the left end edge of the front side plate 11 through a connecting portion 17 which is in the shape of an arc (quarter of a circle) in plan view. The rear end edge of the rear left side plate 16 is connected to the left end edge of the rear side plate 12 through a connecting portion 18 which is in the shape of an arc (quarter of a circle) in plan view.

The right side plate 14 has a rectangular side-view shape elongated in the front-rear direction. The front end edge of the right side plate 14 is connected to the right end edge of the front side plate 11 through a connecting portion 19 which is in the shape of an arc (quarter of a circle) in plan view. The rear end edger of the right side plate 14 is connected to the right end edge of the rear side plate 12 through a connecting portion 20 which is in the shape of an arc (quarter of a circle) in plan view.

A top plate 21 is bridgingly disposed between the upper end edges of right end portions of the front side plate 11 and the rear side plate 12.

Figure 3:
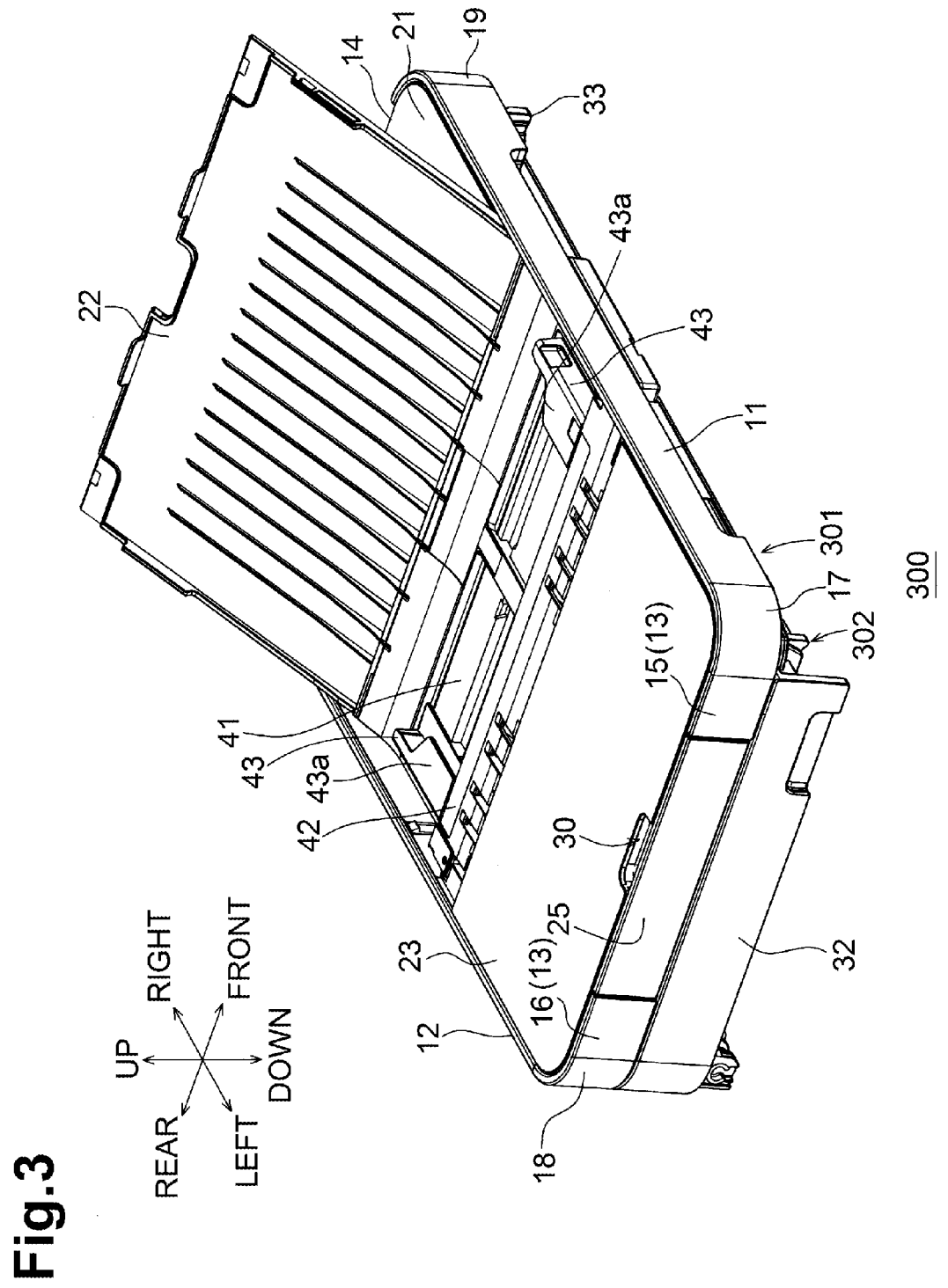
FIG. 3 is a perspective view, from the left front upper side, of an image reading unit, showing the condition where a tray is disposed in a use position and a discharge cover is closed.
Figure 4:
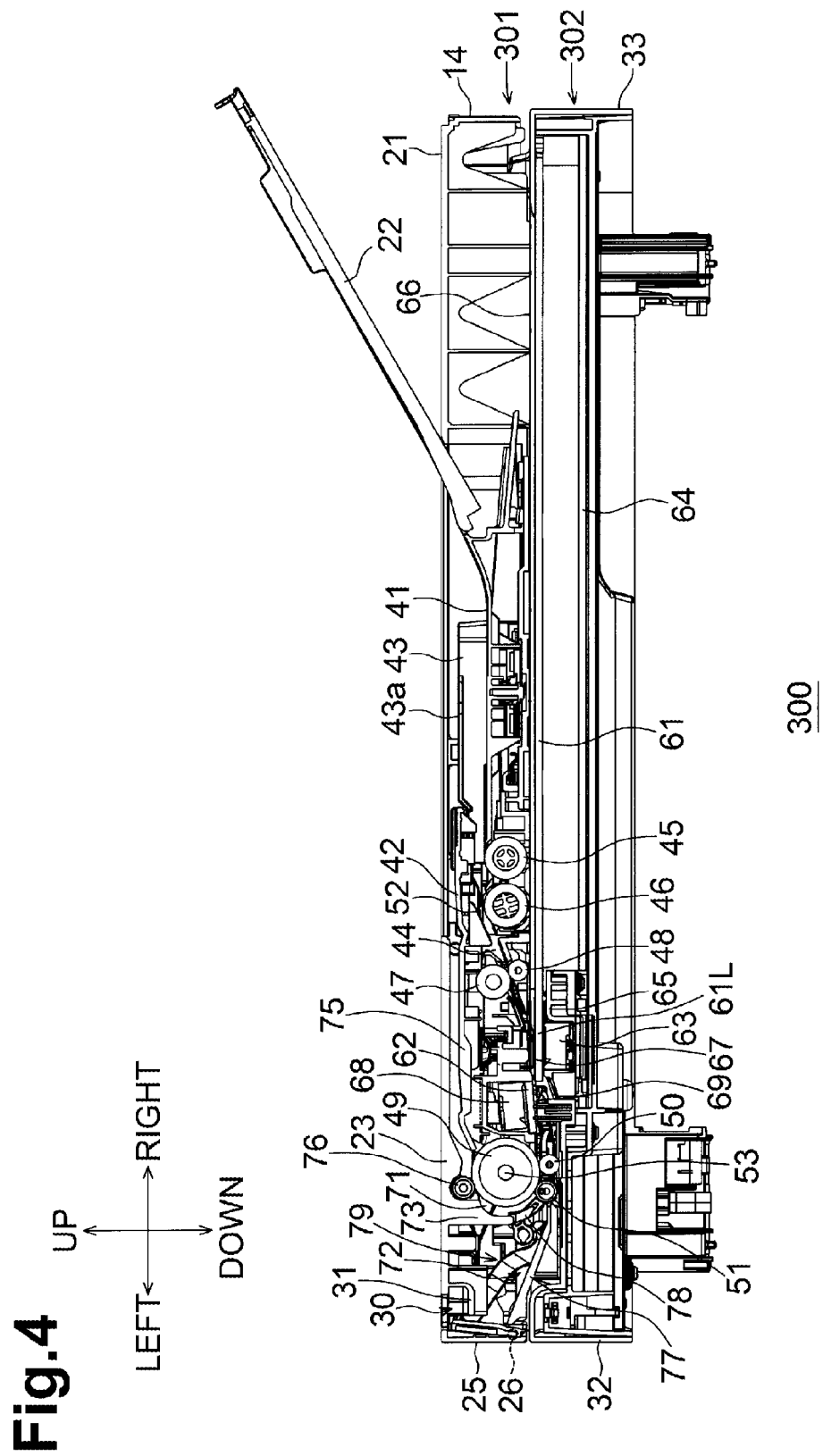
FIG. 4 is a sectional view of the image reading unit shown in FIG. 3.

A tray 22 is provided between left-right-directionally central portions of the front side plate 11 and the rear side plate 12. The tray 22 may be displaced into a non-use position and a use position. In the condition where the tray 22 is disposed in the non-use position, the outer surface of the tray 22 is disposed on the same plane as the upper surface of the top plate 21, as shown in FIG. 1. When the tray 22 is displaced from the non-use position into the use position, a left end portion of the tray 22 disposed in the non-use position is lifted up, and the tray 22 is turned to the right side, with its right end portion as a fulcrum. In the use position, the tray 22 extends rightwardly upward, as shown in FIGS. 3 and 4.

A maintenance cover 23 is provided between left end portions of the front side plate 11 and the rear side plate 12. The maintenance cover 23 may be opened and closed, by turning about an axis extending along the right end edge thereof. In the condition where the maintenance cover 23 is closed, the outer surface of the maintenance cover 23 is disposed on the same plane as the upper surfaces of the top plate 21 and the tray 22, as shown in FIG. 1. In the condition where the maintenance cover 23 is opened, the maintenance cover 23 is in a posture of extending leftwardly upward, with its left end portion lifted up.

In the condition where the tray 22 is disposed in the non-use position and the maintenance cover 23 is closed, the upper surface of the top plate 21 and the outer surface of the tray 22 and the outer surface of the maintenance cover 23 form an upper surface 24 of the upper unit 301.

Figure 5:
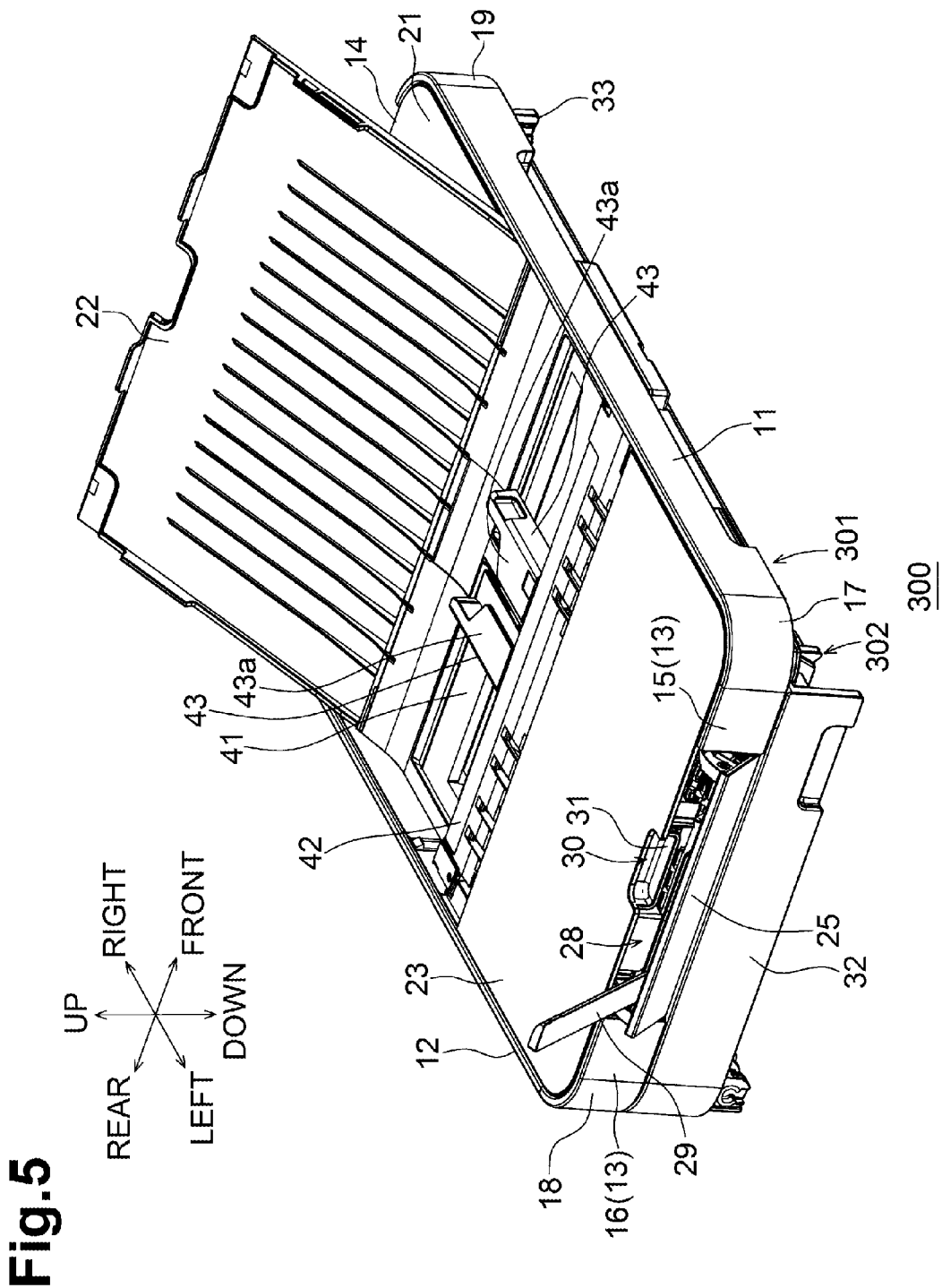
FIG. 5 is a perspective view, from the left front upper side, of the image reading unit, showing the condition where the tray and the discharge cover are opened.
Figure 6:
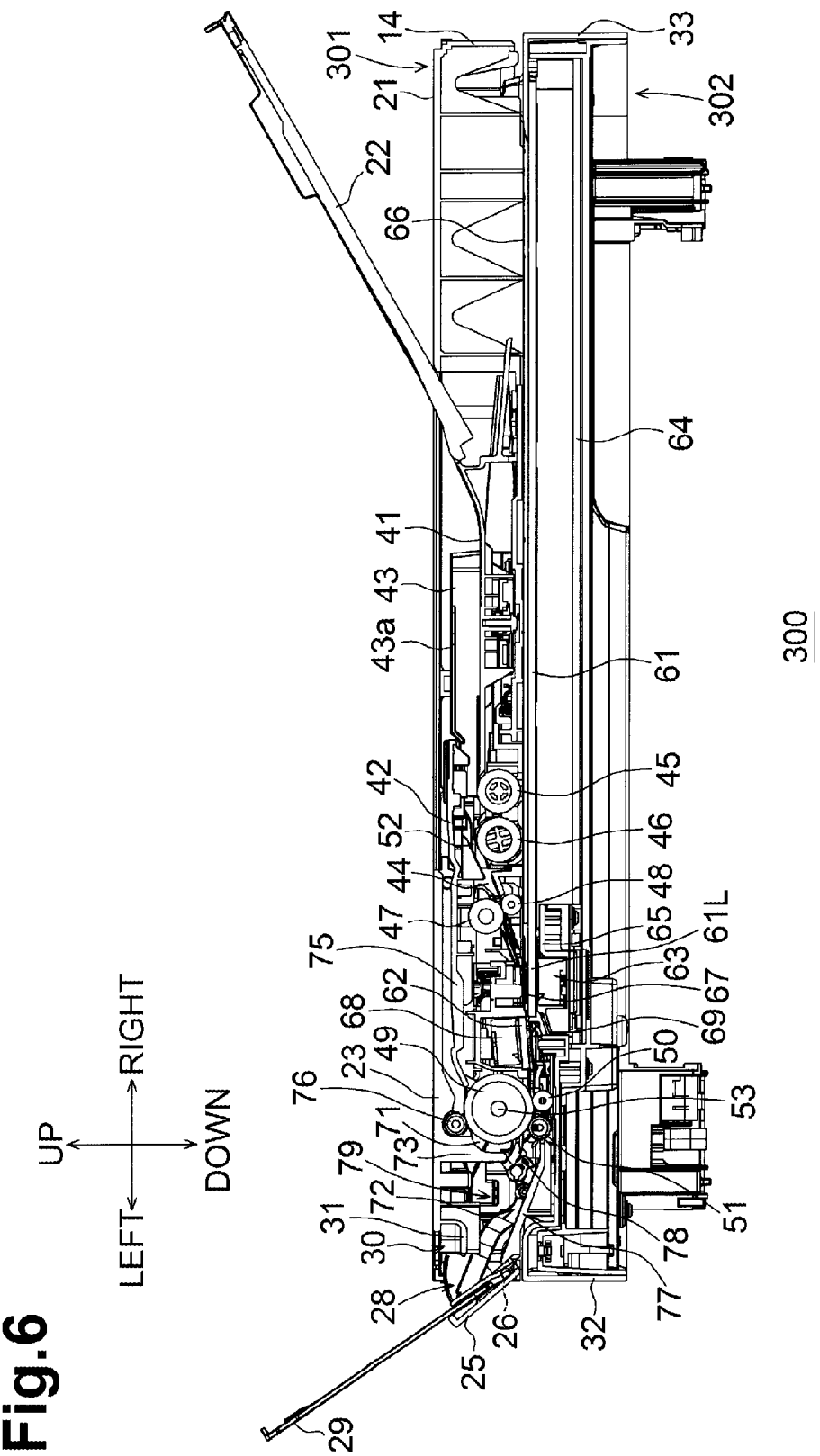
FIG. 6 is a sectional view of the image reading unit shown in FIG. 5.

The front left side plate 15 and the rear left side plate 16 are formed to have the same length in the front-rear direction, with a spacing left therebetween. In addition, a discharge cover 25, as an example of a movable member, is provided between the front left side plate 15 and the rear left side plate 16. The discharge cover 25 may be opened and closed, by turning thereof about a turning shaft 26 (see FIGS. 4 and 6) provided as an example of a fulcrum (for turning) extending along the lower end edge thereof. In the condition where the discharge cover 25 is closed, the outer surface of the discharge cover 25 is disposed on the same plane as the outer surfaces of the front left side plate 15 and the rear left side plate 16, as shown in FIGS. 1 to 3; in addition, it forms a left side surface 27 of the upper unit 301, together with the outer surfaces of the front left side plate 15 and the rear left side plate 16. The upper surface 24 as an example of the first surface and the left side surface 27 as an example of the second surface constitute an example of a cover. When the discharge cover 25 is opened, on the other hand, a discharge port 28 in a rectangular shape elongated in the front-rear direction in side view is formed between the front left side plate 15 and the rear left side plate 16, as shown in FIGS. 5 and 6.

The discharge cover 25 is provided with a fall-preventing member 29. In the condition where the discharge cover 25 is closed, the fall-preventing member 29 is stored inside the discharge cover 25, as shown in FIG. 4. In the condition where the discharge cover 25 is opened, the fall-preventing member 29 may be displaced between a stored posture of extending forward from a rear end portion of the discharge cover 25 and an opened posture of extending leftwardly upward.

In the condition where both the maintenance cover 23 and the discharge cover 25 are closed, as shown in FIG. 3, the left end edge of the maintenance cover 23 and the upper end edge of the discharge cover 25 abut on each other and both extend in the front-rear direction, substantially with no gap therebetween.

The maintenance cover 23 is formed, in a front-rear-directionally central area of a left end portion thereof, with a finger insertion part 30 as an example of an opening part. The finger insertion part 30 is in the shape of a rectangular cutout from the left end edge of the maintenance cover 23, in plan view. In addition, as shown in FIG. 5, the finger insertion part 30 is a recessed part which is recessed downward from the upper surface of the maintenance cover 23, is open on the upper side and the left side, and has a bottom surface 31. In the condition where both the maintenance cover 23 and the discharge cover 25 are closed, the discharge cover 25 may be opened by putting a fingertip into the finger insertion part 30 and pushing an upper end portion of the discharge cover 25 leftward by the fingertip. Besides, in the condition where both the maintenance cover 23 and the discharge cover 25 are closed, the maintenance cover 23 may be opened by putting a fingertip into the finger insertion part 30 and pulling a left end portion of the maintenance cover 23 upward by the fingertip.

The lower unit 302 of the image reading unit 300 has a left side plate 32 and a right side plate 33. The left side plate 32 and the right side plate 33 each have a rectangular side-view shape elongated in the front-rear direction, and they are disposed opposite to each other, with a left-right-directional spacing therebetween. The outer surface of the left side plate 32 is disposed on the same plane as the outer surfaces of the front left side plate 15 and the rear left side plate 16 of the upper unit 301. The outer surface of the right side plate 33 is disposed on the same plane as the outer surface of the right side plate 14 of the upper unit 301.

<Inside Configuration of Image Reading Unit>

In a zone exposed when the tray 22 is disposed in the use position, there are provided a supply unit 41 and a discharge unit 42, as shown in FIGS. 3 to 6.

The supply unit 41 is located on the lower side of the discharge unit 42. An upper surface, exclusive of its right end portion, of the supply unit 41 is formed to be a flat surface extending in the front-rear direction and the left-right direction. The right end portion of the upper surface of the supply unit 41 is inclined rightwardly upward while curving gradually. In addition, the right end portion of the upper surface of the supply unit 41 is connected to a lower end portion of the inner surface of the tray 22 disposed in the use position, with a minute gap therebetween.

The supply unit 41 is provided with a pair of document width guides 43. The pair of document width guides 43 are opposed to each other in the front-rear direction. The pair of document width guides 43 may be moved toward and away from each other, by the same amount, with reference to the center (midpoint) of the interval therebetween. The interval between the pair of document width guides 43 is adjusted to the width of a document, and the document is inserted into the area between the document width guides 43 from the right side. This results in that the document is mounted on the supply unit 41 and the tray 22 in a centered manner (with reference to the midpoint between the document width guides 43).

The document width guides 43 are each formed with an extension member 43a. The extension member 43a extends from the upper end edge of the document width guide 43 inward along the opposing direction of the pair of document width guides 43.

The discharge unit 42 is provided on the upper side of the supply unit 41, with a spacing therebetween. The discharge unit 42 has a rectangular shape extending in the front-rear direction and the left-right direction. Onto the discharge unit 42, the document is discharged rightward from the inside of a housing of the image reading unit 300. Then, a right end portion of the document is discharged past the discharge unit 42, to be mounted onto the tray 22. A left end portion of the document is left on the discharge unit 42, to be placed on the discharge unit 42. Incidentally, on the upper side of the document or documents set on the supply unit 41, the extension members 43a of the document width guides 43 are located. Therefore, the discharged document or documents mounted on both the discharge unit 42 and the tray 22 would not be mixed with the to-be-read document or documents mounted on both the supply unit 41 and the tray 22.

The upper unit 301 is formed therein with a common path 44, as shown in FIGS. 4 and 6. The common path 44 extends leftward from a left end portion of the supply unit 41, then bends to extend leftwardly downward, and further bends to extend leftward.

A route along which the document is conveyed by a supply roller 45, a separation roller 46, a first LF roller 47, a driven roller 48, second LF rollers 49 and driven rollers 50 and 51 forms the common path 44. Incidentally, guide members composed of ribs or a first contact glass 61 and a second contact glass 62 (which contact glasses will be described later) and the like are provided in the spaces between the above-mentioned rollers, such as the space between the first LF roller 47 and the second LF rollers 49. The common path 44 is formed by the guide members and the various rollers. The combination of these rollers form a document conveyer. As described above, these rollers (the document conveyor) are covered by upper surface 24 and left side surface 27. The combination of upper surface 24 and left side surface 27 may generally referred to as a cover that covers the document conveyor.

The supply roller 45 is disposed at the entrance of the common path 44. The supply roller 45 may be rotated about an axis which extends in the front-rear direction.

The separation roller 46 is provided at a position spaced to the left from the supply roller 45. The separation roller 46 may also be rotated about an axis which extends in the front-rear direction. On the upper side of the separation roller 46 is provided a separator piece 52. The separator piece 52 is formed of rubber, for example. The separator piece 52 is put in elastic contact with the circumferential surface of the separation roller 46 from above.

The first LF roller 47 and the driven roller 48 are disposed opposite to each other, with the leftwardly slanted-down portion of the common path 44 therebetween. The first LF roller 47 and the driven roller 48 may each be rotated about an axis which extends in the front-rear direction. The circumferential surface of the driven roller 48 is put in contact with the circumferential surface of the first LF roller 47 from below.

The second LF rollers 49 and the driven rollers 50 and 51 are disposed in the vicinity of an exit of the common path 44.

For example, three such second LF rollers 49, as an example of convey roller, are arranged along the front-rear direction. The three second LF rollers 49 are mounted, at mutually spaced positions, to a rotating shaft 53 which extends in the front-rear direction. The middle one of the second LF rollers 49 is disposed in a front-rear-directionally central area. Both end portions of the rotating shaft 53 are rotatably held on the upper unit 301. This ensures that the three second LF rollers 49 may be rotated, with the rotating shaft 53 as a center of rotation.

The driven roller 50 is disposed opposite to the second LF rollers 49, with the common path 44 therebetween. The driven roller 50 may be rotated about an axis which extends in the front-rear direction. The circumferential surface of the driven roller 50 is in contact with the circumferential surface of each second LF roller 49, at a position slightly deviated to the right side from the lowermost point of the circumferential surface of the second LF roller 49.

The driven roller 51 is disposed opposite to the middle second LF roller 49, with the common path 44 therebetween. No driven roller 51 is provided for the front and rear second LF rollers 49. The driven roller 51 may be rotated about an axis which extends in the front-rear direction. The circumferential surface of the driven roller 51 is in contact with the circumferential surface of the middle second LF roller 49, at a position slightly deviated to the left side from the lowermost point of the circumferential surface of the middle second LF roller 49.

The common path 44 extends through the upper side of the first contact glass 61 and the second contact glass 62, between the first LF roller 47 and the second LF rollers 49.

The first contact glass 61, as an example of a contact surface and a mount surface, is composed of a glass plate and is held by the lower unit 302. The first contact glass 61 has a rectangular thin plate-like shape elongated in the left-right direction. The width (size) of the first contact glass 61 in the front-rear direction is approximately equal to the width (size) of the common path 44 in the front-rear direction. The common path 44 extends through the upper side of a left end portion 61L of the first contact glass 61.

On the lower side of the first contact glass 61 is provided a CIS (contact image sensor) module 63, as an example of a reading unit. The CIS module 63 is mounted on a carriage 65 which may be reciprocated along a guide rail 64. The guide rail 64 extends in the left-right direction, in parallel to the first contact glass 61. This ensures that when the carriage 65 is moved along the guide rail 64, the CIS module 63 is moved in the left-right direction along the first contact glass 61. The CIS module 63 is provided therein with, for example, an LED (Light Emitting Diode) light source, a lens or lenses, an image sensor and the like.

On the upper side of the first contact glass 61 is provided a first document presser member 66. The first document presser member 66 is formed, for example, from a white resin in a rectangular shape. The rectangular shape is approximately equal to the first contact glass 61 in the width (size) in the front-rear direction and smaller than the first contact glass 61 in the width (size) in the left-right direction. The first document presser member 66 is held by the upper unit 301.

In the condition where the upper unit 301 is in an opened posture, as shown in FIG. 2, the first contact glass 61 is exposed on the upper side of the lower unit 302, and the first document presser member 66 is exposed on the lower side of the upper unit 301. On the other hand, in the condition where the upper unit 301 is stacked on the lower unit 302, as shown in FIGS. 4 and 6, the first document presser member 66 is pressed against the portion, exclusive of the left end portion 61L, of the first contact glass 61. In this instance, the upper unit 301 functions as a document cover which covers the first contact glass 61.

On the upper side of the left end portion 61L of the first contact glass 61 is provided a second document presser member 67. The second document presser member 67 is formed, for example, from a white resin to be approximately equal to the first contact glass 61 in the length (size) in the front-rear direction. The second document presser member 67 is held by the upper unit 301. In the condition where the upper unit 301 is stacked on the lower unit 302, the second document presser member 67 is elastically pressed against the left end portion 61L of the first contact glass 61 from above.

The second contact glass 62 as an example of a second contact surface is composed of a glass plate, is held by the upper unit 301, and faces the common path 44 from above, on the left side of the first contact glass 61. The second contact glass 62 has a rectangular thin plate-like shape elongated in the front-rear direction. The width (size) of the second contact glass 62 in the front-rear direction is approximately equal to the width (size) of the common path 44 in the front-rear direction.

On the upper side of the second contact glass 62 is provided a CIS module 68, as an example of a second reading unit. The CIS module 68 is secured to the upper unit 301. The CIS module 68 is disposed in such an area as to overlap with the second LF roller 49, as viewed in a direction parallel to the second contact glass 62. The CIS module 68 is provided therein with, for example, an LED light source, a lens or lenses, an image sensor and the like.

On the lower side of the second contact glass 62 is provided a third document presser member 69. The third document presser member 69 is formed, for example, from a white resin to be approximately equal to the second contact glass 62 in the length in the front-rear direction. The third document presser member 69 is held by the lower unit 302. In the condition where the upper unit 301 is stacked on the lower unit 302, the third document presser member 69 is elastically pressed against the second contact glass 62 from below.

The upper unit 301 is formed therein with a U-turn path 71 and a straight path 72 which are to be described later.

Figure 7:
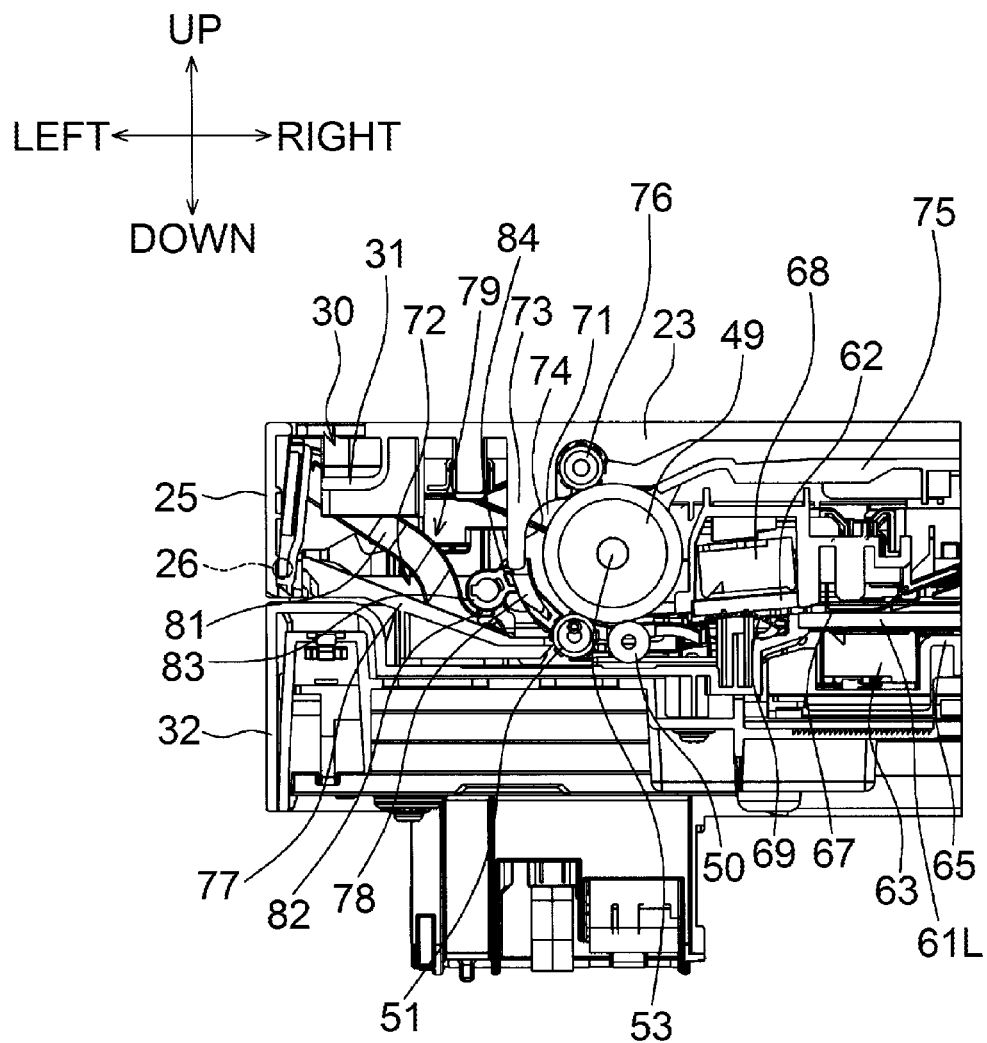
FIG. 7 is a sectional view of a left end portion of the image reading unit shown in FIG. 4.
Figure 8:
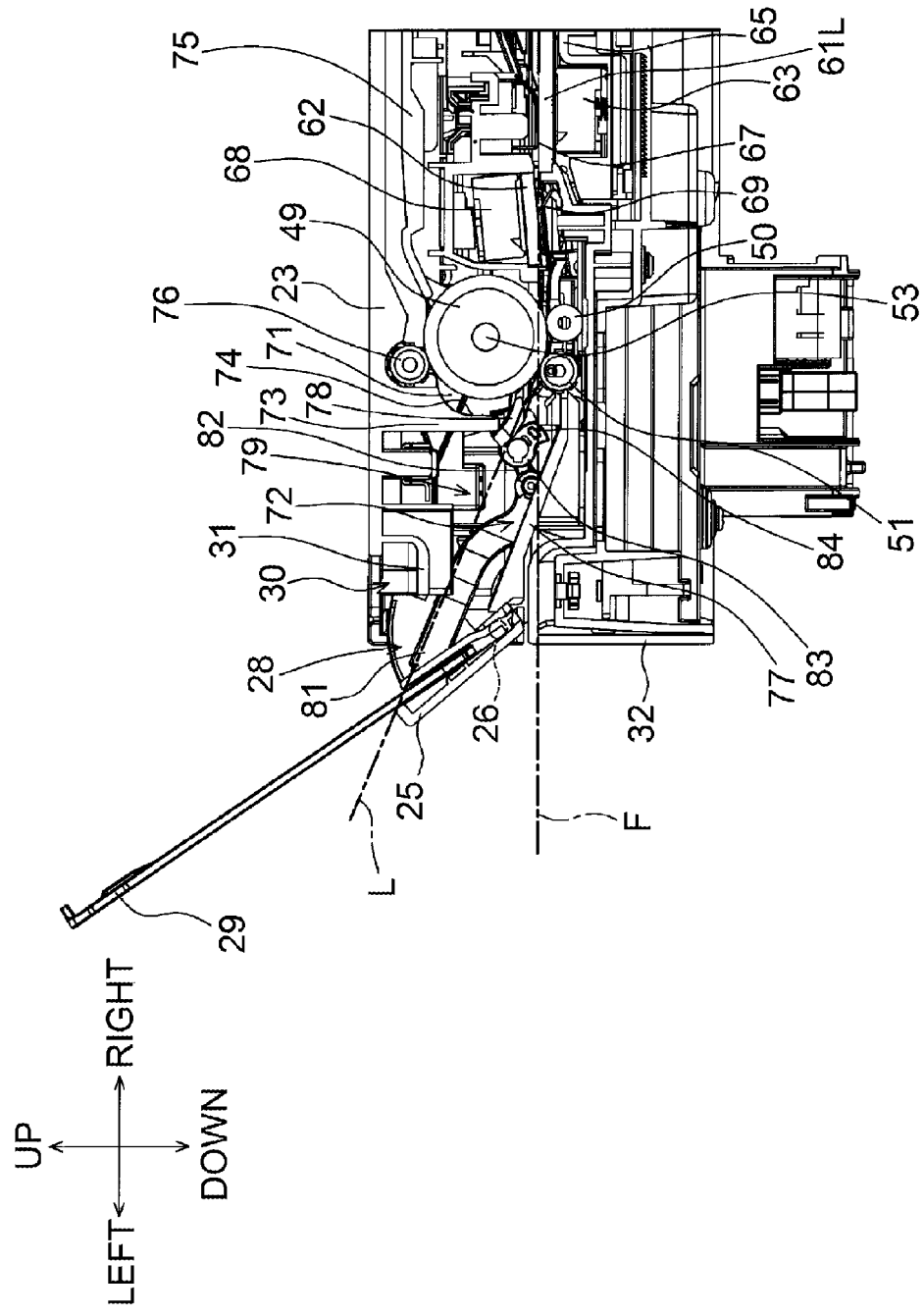
FIG. 8 is a sectional view of a left end portion of the image reading unit shown in FIG. 6.

A wall part 73 as an example of a wall is projectingly formed at the inner surface of the maintenance cover 23. The wall part 73 extends in the front-rear direction; as shown in FIGS. 7 and 8, it has a guide surface 74 curved along the circumferential surface of the second LF roller 49 while being spaced to the left side from the circumferential surface of the second LF roller 49. In addition, in the inside of the upper unit 301 is formed the U-turn guide member 75, which extends in the left-right direction while being spaced downward from the inner surface of the maintenance cover 23. A left end portion of a U-turn guide member 75 is disposed at a position minutely spaced to the right side from the uppermost point of the circumferential surface of the second LF roller 49. A right end portion of the U-turn guide member 75 is disposed at a position minutely spaced to the left side from a left end portion of the discharge unit 42.

The U-turn path 71, as an example of a second conveying route, is composed of a space between the circumferential surface of the second LF roller 49 and the guide surface 74 and a space between the inner surface of the maintenance cover 23 and the upper surface of the U-turn guide member 75. An entrance of the U-turn path 71 is defined by the second LF roller 49 and a flapper 78 (described later), and communicates with the exit of the common path 44. The U-turn path 71 is curved from its entrance upward along the circumferential surface of the second LF roller 49, and extends rightward from the uppermost point of the circumferential surface of the second LF roller 49. An exit of the U-turn path 71 is defined by a right end portion of the inner surface of the maintenance cover 23 and the U-turn guide member 75. The width (size) of the U-turn path 71 in the front-rear direction is approximately equal to the width (size) of the common path 44 in the front-rear direction.

On a left upper side of the second LF rollers 49 is disposed a driven roller 76, with the U-turn path 71 therebetween. The driven roller 76 may be rotated about an axis which extends in the front-rear direction. The circumferential surface of the driven roller 76 is put in contact with the circumferential surface of the second LF roller 49 from the left upper side.

The straight path 72, as an example of a first conveying route and a document conveying space, extends leftwardly upward from the exit of the common path 44.

Specifically, a straight guide member 77 is provided on the left side of the driven roller 51. The straight guide member 77 is thin plate-like in shape. The straight guide member 77 a little extends leftward from the vicinity of the vertical-directionally middle point of the circumferential surface of the driven roller 51, is then bent leftwardly upward and extends. A left end portion of the straight guide member 77 is disposed in the vicinity of a lower end portion of the discharge cover 25. In addition, the length in the front-rear direction of the straight guide member 77 is smaller than the spacing between the rear end face of the front-side second LF roller 49 and the front end face of the rear-side second LF roller 49. Besides, the straight path 72 is composed of a space which extends leftwardly upward along the upper surface of the straight guide member 77. The upper surface is an example of a guide surface.

In addition, in a bifurcating area of the U-turn path 71 and the straight path 72, there is disposed the flapper 78 as an example of a guide member. The flapper 78 has a roughly rectangular plate-like shape elongated in the front-rear direction. Besides, the flapper 78 may be swung about an axis extending in the front-rear direction, into a first position shown in FIG. 8 and a second position shown in FIG. 7, within the upper unit 301.

As shown in FIG. 8, the flapper 78 in the first position is so disposed as to extend along the straight path 72, with its right end portion closing the U-turn path 71. The flapper 78 in the first position permits the document to advance from the common path 44 into the straight path 72.

On the other hand, the flapper 78 in the second position, as shown in FIG. 7, extends along the U-turn path 71, with its lower end portion closing the straight path 72.

The flapper 78 is selectively set into the first position and the second position, interlockedly with the opening and closing of the discharge cover 25.

For this interlocking, a link mechanism 79 as an example of an interlocking unit is provided. The link mechanism 79 includes a first link arm 81, a second link arm 82 and a cam member 83. One end portion of the first link arm 81 is turnably connected to the discharge cover 25. The other end portion of the first link arm 81 is turnably connected to one end portion of the second link arm 82. The other end portion of the second link arm 82 is connected to the cam member 83 so that they may not be rotated relative to each other. The cam member 83 is supported on a turning shaft which extends in the front-rear direction. The turning shaft of the cam member 83 is turnably held by the upper unit 301. A projection part 84 is projectingly formed at a circumferential surface of the cam member 83.

In the condition where the discharge cover 25 is closed, as shown in FIG. 7, the projection part 84 of the cam member 83 makes contact with an upper end portion of the flapper 78 from the left side, and the flapper 78 is disposed in the second position. When the discharge cover 25 is opened from this condition, the first link arm 81 is moved leftward. Attendant on this movement of the first link arm 81, the one end portion of the second link arm 82 is moved leftward, and the other end portion of the second link arm 82 and the cam member 83 are turned clockwise in FIG. 7. Consequently, as shown in FIG. 8, the projection part 84 of the cam member 83 is separated from the flapper 78, and the flapper 78 is displaced from the second position for forming the U-turn path 71 into the first position for forming the straight path 72. Besides, when the discharge cover 25 is closed from this condition, the first link arm 81 is moved rightward. Attendant on this movement of the first link arm 81, the one end portion of the second link arm 82 is moved rightward, and the other end portion of the second link arm 82 and the cam member 83 are turned counterclockwise in FIG. 8. This results in that, as shown in FIG. 7, the projection part 84 of the cam member 83 presses the flapper 78 from the left side, to displace the flapper 78 from the first position into the second position.

<Image Reading Operation 1>

In the image reading unit 300, an ADF (Auto Document Feed) function is used, whereby images formed respectively on both sides of a document may be read concurrently, based on an ADF system, which is an example of a second reading system. In addition, reading of an image formed on one side of the document may also be carried out.

For instance, in the case where the document is an A4 sheet of plain paper, the discharge cover 25 is closed. In the condition where the tray 22 is opened, as shown in FIG. 3, the spacing between the pair of document width guides 43 is adjusted roughly to the length of the shorter edge of the A4 sheet. Thereafter, the document or documents are inserted into the space between the pair of document width guides 43 from the right side. The spacing between the pair of document width guides 43 is adjusted to the length in the front-rear direction of the document or documents thus inserted. In this way, the document or documents are mounted on the supply unit 41 and the tray 22.

A leading end portion of the document inserted into the space between the pair of document width guides 43 from the right side is disposed on the circumferential surface of the supply roller 45. When the supply roller 45 is rotated counterclockwise as viewed from the front side, a frictional force between the lower side (lower surface) of the lowermost one of the document or documents placed on the supply unit 41 and the circumferential surface of the supply roller 45 causes the lowermost document to be conveyed into the common path 44. In this instance, together with the lowermost document, a few documents on the upper side of the lowermost document may be simultaneously conveyed to the common path 44 side.

The separation roller 46 is being rotated counterclockwise as viewed from the front side. When the leading edge of a document comes into contact with a contact part between the circumferential surface of the separation roller 46 and the separator piece 52, the rotation of the separation roller 46 causes the document to be drawn into the position between the circumferential surface of the separation roller 46 and the separator piece 52. The frictional force exerted on the document from the circumferential surface of the separation roller 46 and the separator piece 52 ensures that the documents are assuredly separated one by one. Then, the lowermost one of the plurality of documents is conveyed through the position between the circumferential surface of the separation roller 46 and the separator piece 52.

The first LF roller 47 is being rotated clockwise as viewed from the front side. The driven roller 48 is being driven to rotate counterclockwise as viewed from the front side, attendant on the rotation of the first LF roller 47. When the leading edge of the document comes into contact with the contact part between the circumferential surface of the first LF roller 47 and the circumferential surface of the driven roller 48, the rotation of the first LF roller 47 causes a leading end portion of the document to be drawn into the position between the circumferential surface of the first LF roller 47 and the circumferential surface of the driven roller 48. Then, a conveying force is exerted on the document from the first LF roller 47.

As the convey of the document proceeds, the lower surface of the document comes to face the left end portion 61L of the first contact glass 61. Then, light is radiated from the CIS module 63 onto the lower surface of the document on the left end portion 61L of the first contact glass 61. In this instance, the reflected light from the lower surface of the document is received by the image sensor in the CIS module 63, whereby reading of the image formed on the lower surface of the document is achieved.

In addition, the upper surface of the document faces the second contact glass 62. Then, light is radiated from the CIS module 68 onto the upper surface of the document on the second contact glass 62. The reflected light from the upper surface of the document is received by the image sensor in the CIS module 68, whereby reading of the image formed on the upper surface of the document is achieved.

Thereafter, the leading edge of the document comes into contact with the contact part between the circumferential surface of the second LF roller 49 and the circumferential surface of the driven roller 50. The second LF roller 49 is being rotated clockwise as viewed from the front side. The driven roller 50 is being driven to rotate counterclockwise as viewed from the front side, attendant on the rotation of the second LF roller 49. This ensures that a leading end portion of the document is drawn into the position between the circumferential surface of the second LF roller 49 and the circumferential surface of the driven roller 50. Then, a conveying force is exerted on the document from the second LF roller 49.

Next, the leading edge of the document comes into contact with the contact part between the circumferential surface of the second LF roller 49 and the circumferential surface of the driven roller 51. The driven roller 51 is being driven to rotate counterclockwise as viewed from the front side, accompanying the rotation of the second LF roller 49. This causes a leading end portion of the document to be drawn into the position between the circumferential surface of the second LF roller 49 and the circumferential surface of the driven roller 51. Then, a conveying force is applied to the document from the second LF roller 49.

In this case, if the discharge cover 25 is in a closed state as shown in FIGS. 4 and 7, the flapper 78 is situated in the second position for forming the U-turn path 71. Therefore, the document conveyed out from the position between the circumferential surface of the second LF roller 49 and the circumferential surface of the driven roller 51 is conveyed through the U-turn path 71, with its leading edge moved along the flapper 78.

The document conveyed through the U-turn path 71 is moved toward the contact part between the circumferential surface of the second LF roller 49 and the circumferential surface of the driven roller 76. The driven roller 76 is being driven to rotate counterclockwise as viewed from the front side, attendant on the rotation of the second LF roller 49. When the leading edge of the document comes into contact with the contact part between the circumferential surface of the second LF roller 49 and the circumferential surface of the driven roller 76, a leading end portion of the document is drawn into the position between the circumferential surface of the second LF roller 49 and the circumferential surface of the driven roller 76. Then, a conveying force is exerted on the document from the second LF roller 49.

Thereafter, when the trailing edge of the document parts from the contact part between the circumferential surface of the second LF roller 49 and the circumferential surface of the driven roller 76, the document is discharged onto the discharge unit 42 and the tray 22, to be placed on both of them.

<Image Reading Operation 2>

In the case where the document is a postcard with high stiffness, for example, the discharge cover 25 is opened. In the condition where the tray 22 is opened, as shown in FIG. 5, the spacing between the pair of document width guides 43 is adjusted roughly to the length of the shorter edge of the document. Thereafter, the document or documents are inserted into the space between the pair of document width guides 43 from the right side. Then, the spacing between the pair of document width guides 43 is adjusted to the length in the front-rear direction of the document or documents thus inserted. In this manner, the document or documents such as postcards are mounted on the supply unit 41.

A leading end portion of the document inserted into the space between the pair of document width guides 43 from the right side is disposed on the circumferential surface of the supply roller 45. When the supply roller 45 is rotated counterclockwise as viewed from the front side, a frictional force between the lower surface of the document and the circumferential surface of the supply roller 45 causes the document to be conveyed into the common path 44.

The separation roller 46 is being rotated counterclockwise as viewed from the front side. When the leading edge of the document comes into contact with the contact part between the circumferential surface of the separation roller 46 and the separator piece 52, the rotation of the separation roller 46 causes the document to be drawn into the position between the circumferential surface of the separation roller 46 and the separator piece 52. Then, the document is conveyed through the position between the circumferential surface of the separation roller 46 and the separator piece 52.

The first LF roller 47 is being rotated clockwise as viewed from the front side. The driven roller 48 is being driven to rotate counterclockwise as viewed from the front side, attendant on the rotation of the first LF roller 47. When the leading edge of the document comes into contact with the contact part between the circumferential surface of the first LF roller 47 and the circumferential surface of the driven roller 48, the rotation of the first LF roller 47 causes a leading end portion of the document to be drawn into the position between the circumferential surface of the first LF roller 47 and the circumferential surface of the driven roller 48. Then, a conveying force is exerted on the document from the first LF roller 47.

As the convey of the document proceeds, the lower surface of the document comes to face the first contact glass 61. Then, light is radiated from the CIS module 63 onto the lower surface of the document on the first contact glass 61. The reflected light from the lower surface of the document is received by the image sensor in the CIS module 63, whereby reading of the image formed on the lower surface of the document is achieved.

In addition, the upper surface of the document comes to face the second contact glass 62. Then, light is radiated from the CIS module 68 onto the upper surface of the document on the second contact glass 62. The light reflected on the upper surface of the document is received by the image sensor in the CIS module 68, whereby reading of the image formed on the upper surface of the document is achieved.

Thereafter, the leading edge of the document comes into contact with the contact part between the circumferential surface of the second LF roller 49 and the circumferential surface of the driven roller 50. The second LF roller 49 is being rotated clockwise as viewed from the front side. The driven roller 50 is being driven to rotate counterclockwise as viewed from the front side, attendant on the rotation of the second LF roller 49. This ensures that a leading end portion of the document is drawn into the position between the circumferential surface of the second LF roller 49 and the circumferential surface of the driven roller 50. Then, a conveying force is applied to the document from the second LF roller 49.

Next, the leading edge of the document comes into contact with the contact part between the circumferential surface of the second LF roller 49 and the circumferential surface of the driven roller 51. The driven roller 51 is being driven to rotate counterclockwise as viewed from the front side, attendant on the rotation of the second LF roller 49. This causes a leading end portion of the document to be drawn into the position between the circumferential surface of the second LF roller 49 and the circumferential surface of the driven roller 51. Then, a conveying force is exerted on the document from the second LF roller 49.

In this instance, since the discharge cover 25 is in an opened state, as shown in FIGS. 6 and 8, the flapper 78 is situated in the first position for forming the straight path 72. In other words, the flapper 78 permits the document to advance from the common path 44 into the straight path 72. Accordingly, the document conveyed out from the position between the circumferential surface of the second LF roller 49 and the circumferential surface of the driven roller 51 is conveyed through the straight path 72.

Thereafter, when the trailing edge of the document parts from the contact part between the circumferential surface of the second LF roller 49 and the circumferential surface of the driven roller 51, a leading end portion of the document is discharged to be placed on the discharge cover 25.

<Image Reading Operation 3>

In the image reading unit 300, reading of an image formed on one side of a document may be carried out by a flatbed system, which is an example of a first reading system.

At the time of reading an image by the flatbed system, the upper unit 301 is displaced from the posture of being stacked on the lower unit 302 into the posture of being opened while lifted up on the front side. As a result, the first contact glass 61 is exposed. A document is mounted on the thus exposed first contact glass 61, with the to-be-read surface of the document facing the first contact glass 61. Thereafter, the upper unit 301 is returned into the posture of being stacked on the lower unit 302. Then, while the CIS module 63 is moved at a constant velocity in the left-right direction, light is radiated from the CIS module 63 onto the lower surface of the document on the first contact glass 61. The light reflected on the lower surface of the document is received by the image sensor in the CIS module 63, whereby reading of the image formed on the lower surface of the document is achieved.

<Advantageous Effects>

As above-mentioned, the upper surface 24 of the upper unit 301 is provided on the upper side of the conveying mechanism, as an example of the conveyor, including the first LF roller 47, the driven roller 48, the second LF rollers 49, and the driven rollers 50 and 51, which are arranged along the common path 44. This ensures that the conveying mechanism as an example of the conveyor is covered, on the upper side thereof, with the upper surface 24 of the upper unit 301, particularly with the maintenance cover 23.

In addition, at the left side surface 27 of the upper unit 301, the discharge cover 25 is provided so that it may be opened and closed. When the discharge cover 25 is opened, the discharge port 28 is opened; when the discharge cover 25 is closed, the discharge port 28 is shut off with the discharge cover 25.

The conveying mechanism, the CIS modules 63 and 68 disposed between the first LF roller 47 and the second LF roller 49, and the straight path 72 are covered with the upper surface 24 of the upper unit 301, irrespectively of whether the discharge cover 25 is opened or closed. This restrains external light from entering into the vicinity of the CIS modules 63 and 68, in other words, into the vicinity of the first contact glass 61 and the second contact glass 62, from above. In addition, since the left side surface 27 of the upper unit 301 extends orthogonally to the upper surface 24, external light coming from above, such as light from an illumination lamp in the room in which the multifunction apparatus 100 is installed, may be restrained from entering via the discharge port 28 when the discharge cover 25 is open.

As a result, external light may be restrained from entering into the vicinity of the CIS modules 63 and 68 at the time of reading the image on a document.

In addition, external light may be restrained from entering into the vicinity of the CIS modules 63 and 68 at the time of capturing white color data. Therefore, the second document presser member 67 serving as a white reference may be accurately read by the CIS module 63. This makes it possible to obtain correct white color data. Besides, the third document presser member 69 serving as a white reference may be accurately read by the CIS module 68, whereby correct white color data may be obtained. Accordingly, at the time of reading the image on a document, favorable shading correction may be performed based on the correct white color data.

Consequently, the accuracy of image reading may be restrained from being lowered due to penetration of external light.

The discharge cover 25 is so provided that its upper-side portion may be displaced, with the turning shaft 26, which extends along the lower end edge of the discharge cover 25, as a center of displacement.

This enables the discharge cover 25 to function as a tray for supporting the document discharged via the discharge port 28 when the discharge cover 25 is open.

In addition, as shown in FIG. 8, the displacement of the discharge cover 25 in the opening direction is restricted at such a position that the angle between an extension plane F extended along the upper surface of the first contact glass 61 and a straight line L interconnecting the point of contact of the second LF roller 49 with the document and the tip of the discharge cover 25 in the open state is not less than 30 degrees.

This ensures that when the discharge cover 25 is opened, the angle of the discharge cover 25 relative to the left side surface 27 of the upper unit 301 may be reduced, so that external light may be more assuredly restrained from entering via the discharge port 28.

The CIS module 68 is fixed in such a position as to face the second contact glass 62.

In a configuration wherein the CIS module 68 is movable, it may be contemplated to read a white reference by the CIS module 68 after moving the CIS module 68 to such a position that influence of external light is reduced, for the purpose of obtaining correct white color data. In the present illustrative embodiment, although the CIS module 68 is fixed, entering of external light via the discharge port 28 is restrained as above-mentioned, and, therefore, external light is restrained from entering into the vicinity of the CIS module 68. As a result, the third document presser member 69 serving as a white reference may be accurately read by the CIS module 68, whereby correct white color data may be obtained.

The CIS module 68 is disposed on the opposite side of the second LF roller 49 from the discharge port 28, and is disposed at such a part as to overlap with the second LF roller 49 as viewed in a direction parallel to the second contact glass 62.

Since the CIS module 68 is located behind the second LF roller 49 as viewed from the discharge port 28, external light may be more assuredly restrained from entering into the vicinity of the CIS module 68.

Between the second LF roller 49 and the discharge port 28, there is provided the straight guide member 77 which guides the document toward the discharge port 28.

This makes it possible to secure some distance between the second LF roller 49 and the discharge port 28. As a result, external light may be further securely restrained from entering into the vicinity of the CIS modules 63 and 68.

Between the second LF roller 49 and the discharge port 28, the flapper 78 is provided in a displaceable manner. In addition, the link mechanism 79 is provided for displacing the flapper 78 interlockedly with the movable of the discharge cover 25.

When the discharge cover 25 is closed from an open state, the flapper 78 is displaced from the first position of extending along the straight path 72 into the second position of extending along the U-turn path 71, interlockedly with the closing of the discharge cover 25. When the flapper 78 is situated in the second position of extending along the U-turn path 71, the second LF roller 49 and the discharge port 28 communicate with each other. Since external light is restrained from entering via the discharge port 28, entering of external light into the vicinity of the CIS modules 63 and 68 is restrained, even in the condition where the second LF roller 49 and the discharge port 28 communicate with each other.

In addition, since entering of external light via the discharge port 28 is restrained, entering of external light into the vicinity of the CIS modules 63 and 68 is restrained even if the straight path 72 is a roughly rectilinear route.

The maintenance cover 23 is formed with the finger insertion part 30 in the front-rear-directionally central area of the left end portion thereof. The finger insertion part 30 is a recessed part which is recessed downward from the upper surface of the maintenance cover 23, is open on the upper side and the left side and has the bottom surface 31.

With the finger insertion part 30 thus formed, it is possible for the user to put a finger into the finger insertion part 30 and to open the discharge cover 25 in a closed state. Therefore, operability in opening the discharge cover 25 may be enhanced. In addition, although external light would enter via the finger insertion part 30 if the finger insertion part 30 were in an open-through form, such entering of external light via the finger insertion part 30 may be restrained because the finger insertion part 30 has the bottom surface 31.

Besides, the wall part 73 is formed at the inner surface of the maintenance cover 23, in the manner of projecting toward the straight path 72. This ensures that, even when the discharge cover 25 is in an open state and external light enters via the discharge port 28 because the discharge port 28 is thus opened, the external light may be restrained by the wall part 73 from entering into the vicinity of the CIS modules 63 and 68.

While the disclosure has been described in detail with reference to the specific embodiments thereof, this is merely an example, and various changes, arrangements and modifications may be applied therein without departing from the spirit and scope of the disclosure.

For instance, the first contact glass 61 and the second contact glass 62 are not restricted to glass plates but may be composed of other transparent plates than glass plates, such as transparent resin plates.

In addition, description has been made of a configuration wherein the left end portion 61L of the first contact glass 61 is an example of the contact surface; however, this is not restrictive. For example, a configuration may be adopted wherein the first contact glass 61 is formed in the same size as the first document presser member 66 in plan view, and wherein a transparent plate as an example of the contact surface is provided on the left side of and adjacent to the first contact glass 61.

Besides, description has been made of a configuration in which the left end edge of the upper surface 24 (the left end edge of the maintenance cover 23) and the upper end edge of the left side surface 27 of the upper unit 301 are abutted on each other, specifically, a configuration wherein the left side surface 27 of the upper unit 301 extends orthogonally to the upper surface 24. However, the orthogonal joining is not restrictive, and it suffices that the joining is at an angle approximate to a right angle. Furthermore, the upper surface 24 and the left side surface 27 may be continuous with each other through a curved surface or an inclined surface. In this case, an effect similar to that of the present embodiment is obtained if, for example, a flat surface constituting a major part of the upper surface 24 and a flat surface constituting a major part of the left side surface 27 are orthogonal to each other, or they intersect at an angle approximate to a right angle.

In addition, it has been described that the upper unit 301 is provided with the front left side plate 15 and the rear left side plate 16, and the discharge cover 25 is provided between the front left side plate 15 and the rear left side plate 16. However, a configuration may be adopted in which the front left side plate 15 and the rear left side plate 16 are omitted, the whole part of the left side plate 13 constitutes a discharge cover 25, and the outer surface of the discharge cover 25 constitutes a left side surface 27 of the upper unit 301.

In the above-described illustrative embodiment, the image reading unit 300 is combined with the image forming unit 200, to constitute the multifunction apparatus 100. However, the image reading unit 300 may constitute a scanner by itself.

Besides, in the above illustrative embodiment, description has been made of the case where the discharge cover 25 is manually opened and closed by the user. However, a configuration may be adopted in which the document size is supplied by manual inputting or automatic detection, and the discharge cover 25 is automatically opened, based on the document size. Furthermore, various design modifications may be applied to the above-mentioned configurations within the scope of the present invention as defined by the claims.

It should be understood by those skilled in the art that various modifications, combinations, sub-combinations and alternations may occur depending on design requirements and other factors insofar as they are within the scope of the appended claims or the equivalent thereof

What is claimed is:

1. An image reader comprising:
a conveyor configured to convey documents in a conveying direction in a U-turn path formed by a curved guide surface;
a reading unit configured to read an image on the document conveyed by the conveyor;
a contact glass that is disposed between the reading unit and the document conveyed by the conveyor;
a cover disposed above the conveyor, the cover including a first surface and a second surface, the first surface located above the reading unit and the contact glass, the second surface extending in a direction for such that a plane of the second surface crosses both a plane of the contact glass and a plane of the first surface;
a first discharge port positioned below the first surface of the cover;
a tray disposed downstream of the first discharge port in the conveying direction, the tray being configured to support the document discharged through the first discharge port;
a movable member disposed on the second surface and configured to be movable between an open position for opening a second discharge port through which the document conveyed by the conveyor is discharged above the movable member and a closed position for closing the second discharge port; and
a surface located between the conveyor and the second discharge port, the surface being configured to support the document when being discharged through the second discharge port.

2. The image reader according to claim 1,
wherein the tray is configured to be movable between a first position and a second position, and
wherein, when the tray is at the second position, the first discharge port is located such that the document is conveyed toward the tray.

3. The image reader according to claim 2, wherein the conveyor further comprises:
a convey roller that is disposed between the reading unit and the discharge port and that conveys toward the discharge port the document in which the image was read by the reading unit,
wherein an angle between an extension plane extended along the contact glass and a straight line interconnecting a point of contact of the convey roller with the document and a tip of the movable member located in the open position is not less than 30 degrees.

4. The image reader according to claim 2, further comprising:
a guide surface by which the document is guided toward the second discharge port, the guide surface configured to be between the convey roller and the second discharge port.

5. The image reader according to claim 2, further comprising:
a guide member that is disposed between the convey roller and the second discharge port and configured to be movable between a first position and a second position different from the first position; and
an interlocking unit by which the guide member is displaced from the first position into the second position interlockedly with displacement of the movable member from the open position into the closed position and by which the guide member is displaced from the second position into the first position interlockedly with displacement of the movable member from the closed position into the open position,
wherein the guide member is configured to:
allow the document being conveyed by the conveyor to move along a first conveying path when the guide member is located in the first position; and
allow the document being conveyed by the conveyor to move along a second conveying path when the guide member is located in the second position, wherein the movable member blocks a part of the first conveying path.

6. The image reader according to claim 1, wherein the conveyor further comprises:
a convey roller located above a plane of the contact glass configured to support the document, and
wherein a portion of the convey roller extends below the plane of the contact glass.

7. The image reader according to claim 1,
wherein a surface of the contact glass that contacts the document is in a first plane,
wherein the surface that contacts the document is in a second plane, and
wherein the second plane is angled relative to the first plane.

8. The image reader according to claim 1, wherein the movable member further comprises:
a lower-end portion that is supported by the second surface to be swingable around an axis extended along the second surface, and
an upper-end portion of the movable member configured to be movable between the open position and the closed position.

9. The image reader according to claim 1, further comprising:
a second reading unit that is disposed between the contact glass and the second discharge port and that reads an image on the document conveyed by the conveyor; and
a second contact glass that is disposed to face the second reading unit and that makes contact with the document conveyed by the conveyor.

10. The image reader according to claim 9,
wherein the contact glass configured to make contact with a first surface of the document conveyed by the conveyor, and
wherein the second contact glass configured to make contact with a second surface, opposite to the first surface, of the document conveyed by the conveyor.

11. The image reader according to claim 1,
wherein the movable member includes an extendable fall prevention member.

12. An image reader comprising:
a first contact glass;
a document cover configured to be movable between an uncovering position where the document cover uncovers the first contact glass and a covering position where the document cover covers the first contact glass, the document cover including a movable member;
a conveyor that is disposed inside the document cover and conveys a document; and
a reading unit configured to read an image on the document by a first reading mode for reading the image on the document supported by the first contact glass while the reading unit moves along the first contact glass and a second reading mode for reading the image on the document conveyed by the conveyor while the reading unit is stopped at a predetermined position facing the first contact glass, wherein the movable member is configured to be movable between an open position for opening a discharge port through which to discharge the document conveyed by the conveyor and a closed position for closing the discharge port, wherein the document cover comprises a first surface located above an upper side of the first contact glass, and a second surface extending in a direction for crossing planes of both the first contact glass and the first surface, and wherein the movable member forms part of the second surface.

13. The image reader according to claim 12,
wherein the conveyor comprises a convey roller that is disposed between the reading unit and the discharge port and that conveys toward the discharge port the document in which the image was read by the reading unit, and
wherein the second surface extends in parallel to an roller axis of rotation of the convey roller.

14. The image reader according to claim 13,
wherein a portion of the convey roller extends below a plane of the contact glass configured to support the document.

15. The image reader according to claim 13,
wherein an angle between an extension plane extended along the first contact glass and a straight line interconnecting a point of contact of the convey roller with the document and a tip of the movable member located in the open position is not less than 30 degrees.

16. The image reader according to claim 13, further comprising
a guide surface by which the document is guided toward the discharge port, the guide surface being between the convey roller and the discharge port.

17. The image reader according to claim 13, further comprising:
a guide member that is disposed between the convey roller and the discharge port and configured to be movable between a first position and a second position different from the first position; and
an interlocking unit by which the guide member is displaced from the first position into the second position interlockedly with displacement of the movable member from the open position into the closed position and by which the guide member is displaced from the second position into the first position interlockedly with displacement of the movable member from the closed position into the open position,
wherein the guide member configured to:
allow the document being conveyed by the conveyor to move along a first conveying path when the guide member is located in the first position; and
allow the document being conveyed by the conveyor to move along a second conveying path when the guide member is located in the second position, wherein the movable member blocks a part of the first conveying path.

18. The image reader according to claim 12,
wherein the movable member includes an extendable fall prevention member.

19. The image reader according to claim 12, wherein the movable member comprises an lower-end portion, that is supported by the second surface to be swingable around an axis extended along the second surface, an upper-end portion of the movable member configured to be movable between the open position and the closed position.

20. An image reader comprising:
a reading unit configured to read an image on a document;
a contact surface that is disposed to face the reading unit and that makes contact with the document subjected to image reading by the reading unit;
a convey roller by which the document having undergone image reading by the reading unit is selectively conveyed toward a first discharge port for discharging the document and a second discharge port for discharging the document; and
a cover disposed at such a position as to cover an upper side of the reading unit, the convey roller, and a document conveying space ranging from the convey roller to the first discharge port, the cover including a movable member capable of being displaced into an open position for opening the second discharge port and a closed position for closing the second discharge port, the cover also including an upper surface located above the first discharge port,
wherein the second discharge port is disposed at such a part as to overlap with the convey roller as viewed in a direction parallel to the contact surface, and
wherein the cover has a wall that is extendingly disposed at such a position as to separate the document conveying space and said wall extends in parallel to an axis of rotation of the convey roller.

21. The image reader according to claim 20,
wherein a portion of the convey roller extends below a plane of the contact surface.

22. The image reader according to claim 20,
wherein the movable member includes an extendable fall prevention member.

* * * * *